C. CARTER.
Ventilating-Attachment to Stoves.

No. 164,259. Patented June 8, 1875.

Witnesses:
L. F. Brous,
A. P. Grant.

Inventor:
Charles Carter
by John A. Wiedersheim
atty.

THE GRAPHIC CO. PHOTO-LITH. 39 & 41 PARK PLACE, N.Y.

UNITED STATES PATENT OFFICE.

CHARLES CARTER, OF PHILADELPHIA, PENNSYLVANIA.

IMPROVEMENT IN VENTILATING ATTACHMENTS TO STOVES.

Specification forming part of Letters Patent No. 164,259, dated June 8, 1875; application filed May 14, 1875.

*To all whom it may concern:*

Be it known that I, CHARLES CARTER, of the city and county of Philadelphia, and State of Pennsylvania, have invented a new and useful Improvement in a Ventilating Attachment to a Stove, Heater, or other apparatus in which combustion is carried on; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1:
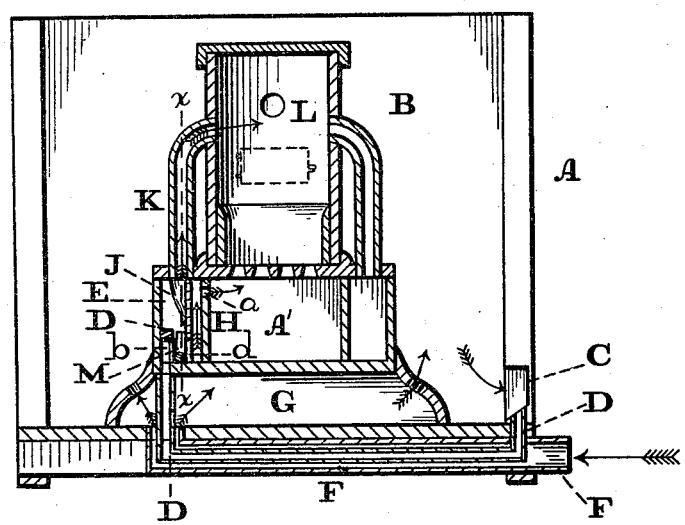
Figure 2:
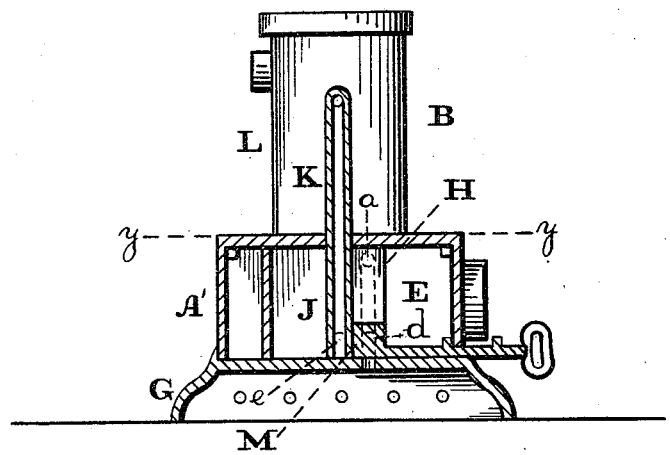
Figure 3:
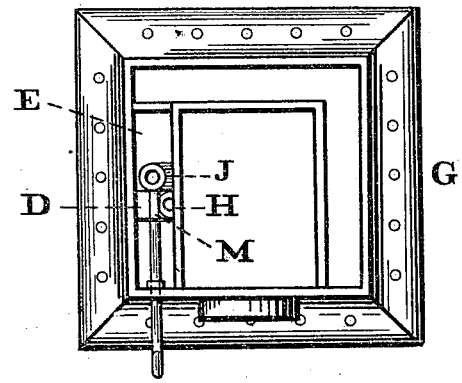

Figure 1 is a longitudinal vertical section of the device embodying my invention. Fig. 2 is a transverse vertical section in line $x\ x$, Fig. 1. Fig. 3 is a top view of the portion below the line $y\ y$, Fig. 2.

Similar letters of reference indicate corresponding parts in the several figures.

The object of my invention is to establish and secure a circulation of air in one or more rooms in dwellings or other structures, in such a manner that the whole of the air which may have become contaminated by use, and rendered foul and unfit for further respiration, may be removed in a given time, and its place taken by the introduction of a supply of properly-warmed pure air.

The invention consists in a pipe which communicates with a ventilating-register, and is inclosed in an air-pipe communicating with the atmosphere and an apartment, whereby the pure air in the latter pipe is warmed, which not only serves to draw it into the space between the two pipes, but gives it a force to drive it to the ceiling or upper part of the apartment, or hot-air chamber of a heater, the contaminated air being directed to the reservoir of a combustion apparatus, so as to be utilized or passed off.

The invention further consists in a provision for directing the contaminated air either under the fuel of a stove, heater, or other apparatus for carrying on combustion, so as to increase the draft or assist combustion, or over the fuel, in case combustion is too active and needs checking, or both under and over the fuel for regulating combustion as may be necessary or desirable.

It also consists in a reservoir, with which communicates the pipe for contaminated air, and the pipes which direct said air above and below the fuel, in connection with a damper which is adapted to close the pipe for contaminated air, so that, in the event of raking the fire, the dust thereof will be directed to the exit-flue.

Referring to the drawings, A represents an apartment, in which is located a stove, heater, or other apparatus, B, in which combustion is carried on, said apparatus being hereafter known as the combustion apparatus. C represents the ventilating-register of the apartment, which is located near the lower portion thereof, and with the same communicates a pipe, D, which passes through or under the floor of the apartment, and opens into a reservoir or chamber, E, formed adjacent to the ash-pit A', or other portion of the combustion apparatus. Surrounding the pipe D, and communicating with the atmosphere, is a pipe, F, which opens into the base G of the apparatus B. Within the reservoir E there are arranged two pipes, H J, both of which communicate with said reservoir. The pipe H communicates with the ash-pit A' by means of an opening, $a$, and the pipe J communicates with a pipe or flue, K, which leads into the combustion-chamber L at a point over the space occupied by the fuel. M represents a damper, which is arranged within the reservoir E, and its handle is conveniently situated for operation. The pipe D projects somewhat into the reservoir E, and has an opening or communication, $b$, at the lower end. The pipe H has an opening, $d$, at its lower end, and the pipe J has also an opening, $e$, at its lower end. The damper M is arranged vertically in the reservoir, and has a sliding motion, so as to cover and uncover the openings $d\ e$ of the pipes H J, and the opening $b$ of the pipe D.

The operation is as follows: The warm air of the apartment ascends and displaces the contaminated air therein, which latter descends and is directed into the ventilating-register C and pipe D, and thence passes into the reservoir E. The fresh or pure air enters the pipe F, and, owing to the warm nature of the contaminated air, the pipe D becomes warm, and the fresh air in pipe E is likewise warmed, whereby said fresh air is drawn into the space between the two pipes D E, and has imparted to it a force that drives it into the apartment and to the ceiling or upper portion thereof, the entrance therein being through the openings in the base G of the apparatus B, or directly into the apartment; and, if desired, it may be directed into the hot-air chamber of a heater. From the reservoir E the contaminated air may be utilized to assist or increase combustion by being passed under the grate of the apparatus through the opening $a$, which communicates with the pipe H. For this purpose the damper M is forced in, so as to cover or close the opening $e$ of the pipe J, whereby the air enters the pipe H, and thus passes to the ash-pit A′.

When the fire is too active or needs checking, the damper is drawn out, so as to cover the opening $d$ of the pipe H, whereby there is a communication between the pipe J and pipe or flue K, and the air then passes through the pipes J and K into the combustion-chamber L over the fuel. For some purposes the air will be required to be passed both above and below the fuel. To accomplish this the damper will be adjusted so as to partly uncover simultaneously the openings $d$ $e$ of the two pipes H J.

During the raking of the fire the dust thereof will be directed from the ash-pit into the chimney or flue, as follows: The damper will be drawn out to or turned over against the opening $b$ of the top of the pipe D in the reservoir, so as to cover said opening. There is now a communication between the ash-pit A′ and the reservoir E by means of the opening $a$, pipe H, and the opening $d$, and between the reservoir and the combustion-chamber L by means of the opening $e$, pipe J, and pipe K. The dust follows the line of said communication, and is consequently passed out the combustion-chamber into the chimney or flue.

The material of which the inclosed pipe D is composed will be preferably a good conductor of heat.

Having thus described my invention, what I claim as new, and desire to secure by Letters Patent, is—

1. The fresh-air pipe F, in combination with the pipe D inclosed thereby, and communicating with the ventilating-register C, and with the reservoir E of a combustion apparatus, B, substantially as and for the purpose set forth.

2. The pipe D, communicating with the ventilating-register C, in combination with the reservoir E, communicating with said pipe, and with the ash-pit A′ and chamber L of a combustion apparatus, B, substantially as and for the purpose set forth.

3. The reservoir E, in combination with the pipe D, having opening $b$, the pipe H, with openings $a$ and $d$, the pipe J, with opening $d$, and the pipe K and combustion-chamber, and with the adjustable damper M, substantially as and for the purpose set forth.

CHARLES CARTER.

Witnesses:
JOHN A. WIEDERSHEIM,
A. P. GRANT.